Nov. 8, 1966  B. PARKER ET AL  3,283,594
TWO-AXIS VISCOUS DRIVE GYRO

Filed Dec. 27, 1963  4 Sheets-Sheet 1

BERNARD PARKER
JOHN C. STILES
LEON WEISBORD
INVENTORS

BY S. A. Giarratana
Francis L. Masselle
ATTORNEYS

BERNARD PARKER
JOHN C. STILES
LEON WEISBORD
INVENTORS

BY *S. A. Giarratana*
*Francis L. Masselle*
ATTORNEYS

3,283,594
TWO-AXIS VISCOUS DRIVE GYRO

Bernard Parker, Teaneck, and John C. Stiles, Morristown, N.J., and Leon Weisbord, New York, N.Y., assignors to General Precision Inc., Little Falls, N.J., a corporation of Delaware
Filed Dec. 27, 1963, Ser. No. 334,970
12 Claims. (Cl. 74—5.46)

This invention relates to gyroscopes and more particularly, it concerns gyroscopes of the type employing a gas bearing rotor support.

The problems arising as a result of undesired restraints in gyro rotor suspension systems have led to a wide variety of gyro designs including gas bearing rotor suspensions of the type to which the present invention relates. Gas bearing gyroscopes basically involve the use of a gas (usually helium or a similar inert gas) for support and lubrication of the gyro rotor within its casing and fall into two major categories: (1) hydrostatic gas bearings and (2) hydrodynamic gas bearings. Both types of gas bearing designs are similarly effective from the standpoint of providing unlimited bearing life, low sensitivity to temperature variation, relatively low restraint levels, cleaner output signals due to the absence of mechanical noise and immunity to radiation. Hydrostatic gas bearings employ an external source of gas and a pump for providing a metered flow of gas at a desired pressure to the bearing gap between moving parts. Hydrodynamic gas bearings, by comparison simply employ a sealed casing filled with the gaseous supporting medium, the rotor being suspended by a differential pressure force due to the gas viscosity and the rotational velocity of the rotor with respect to a bearing member. Also, both types of gas bearing designs may be employed in either single axis gyros or two-axis gyros with substantially equal effectiveness.

While gas bearing gyroscopes heretofore available have been effective from the standpoint of reducing undesired error producing restraints in the gyro rotor suspension, a measure of such undesired restraint has been experienced in the transmission of spin torque to the gyro rotor. For example, one form of gas bearing gyroscope presently available employs an electric motor winding supported within the gyro casing about the rotor spin axis so that spin torque is developed and transmitted by electromagnetic force acting directly on the rotor. As a result, certain electromagnetic restraints are imposed on the rotor by virtue of the drive coupling. Similar restraints, either mechanical or electrical, have been found to exist in other types of gas bearing gyroscopes presently available due to the coupling of similar drive means with the rotor.

In accordance with the present invention, the undesired restraints due to rotor drive coupling or transmission previously experienced in gas bearing gyroscope designs are substantially eliminated by transmitting rotor spin torque by employment of a viscous gas drive. Hence, in one form of the invention, a two-axis gyroscope is effected by providing a spherical bearing member rotatable on the gyro spin axis and about which a complementing spherical surface on the gyro rotor is suspended and driven by a hydrodynamic gas bearing. In this form of the invention, the spherical bearing member is rotatably driven about the spin axis by conventional electric motor means at speeds in excess of rotor spin speed so that the rotor, in addition to being suspended on gas in the gap between the spherical bearing member and the complementing spherical surface on the rotor, is driven about the spin axis by the viscous drag of the gas bearing between the rotating bearing member and the rotor. The rotor will stabilize at constant speed when the driving torque transmitted through the gas bearing clearance gap is equal to the drag torques experienced on the periphery of the rotor. Also, the small restraints due to viscous or turbulent effects between the rotor and the case or case associated parts of the gyroscope are compensated for by quadrature and in phase restraint compensation devices. The quadrature restrain compensation preferably takes the form of an eddy current device adjustable by regulating current supplied to a quadrature compensation coil whereas the in phase restraint compensation is preferably in the form of a bearing ring having an adjustable gap between the rotor and the ring to balance the pressure induced torques on the rotor with the in phase spring restraint. In an alternative form, the rotor is supported on a stationary inner spherical member in accordance with the principles of a conventional gas bearing gyroscope and is driven by a viscous gas drive between the rotor and a rotatable outer case member. Hence, in the alternative form also, the only restraints imposed on the rotor are as a result of viscous or turbulent effects in the gaseous media employed which are, by nature, relatively small.

A principal object of this invention, is therefore, the provision of a gas bearing gyroscope by which the restraints imposed on the rotor as a result of transmitting driving torque thereto are substantially eliminated.

Another object of this invention is the provision of a gas bearing gyroscope of the type referred to which is capable of measuring angular displacement along two mutually orthogonal axes and which is devoid of all restraints except those resulting from the viscous or turbulent effects of the gas bearing thereof.

A further object of this invention is to provide a gas bearing gyroscope of the type referred to having improved restraint compensation by which a substantially ideal, freely rotating inertial member may be effected.

Another object of this invention is the provision of a two-axes gas bearing gyroscope having improved quadrature restraint compensation so that the effect of restraint torque due to misalignment between the axis of input or drive rotation and rotor spin axis may be substantially or completely eliminated.

A still further object of the present invention is to provide a two-axis gas bearing gyroscope having highly effective compensation for restraint resulting from misalignment between the rotor and rotor case.

Still other objects and further scope of applicability of the present invention will become apparent from the detail description given hereinafter and taken in conjunction with the accompanying drawings in which.

Figure 1:
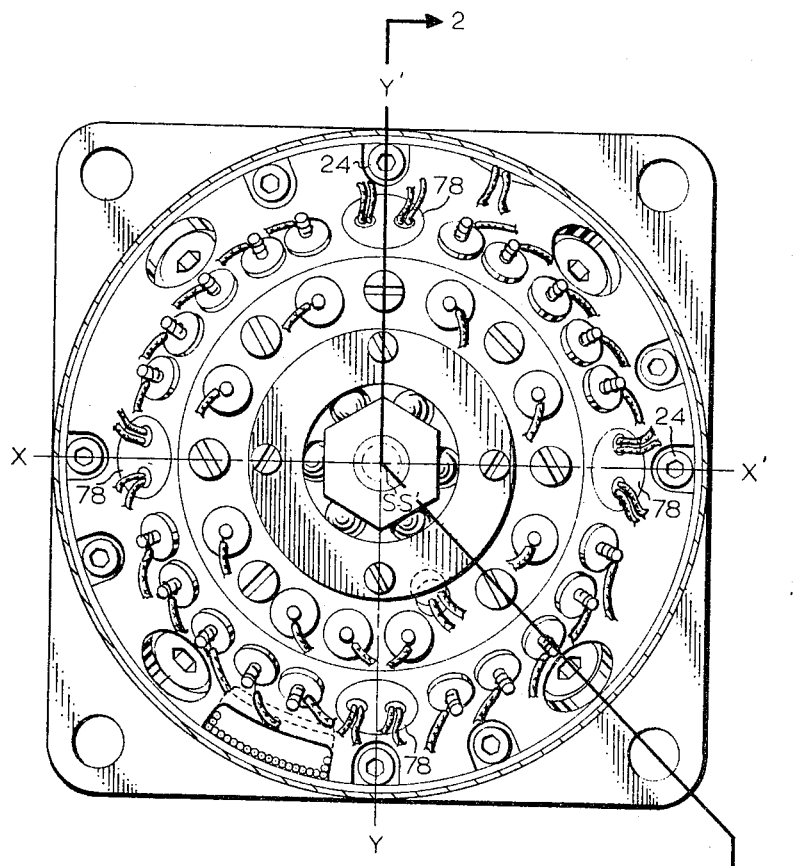
FIG. 1 is an end elevation of a preferred form of gas bearing gyroscope in accordance with the present invention with the external housing thereof in cross-section to show the rotor and rotor casing exterior.
Figure 2:
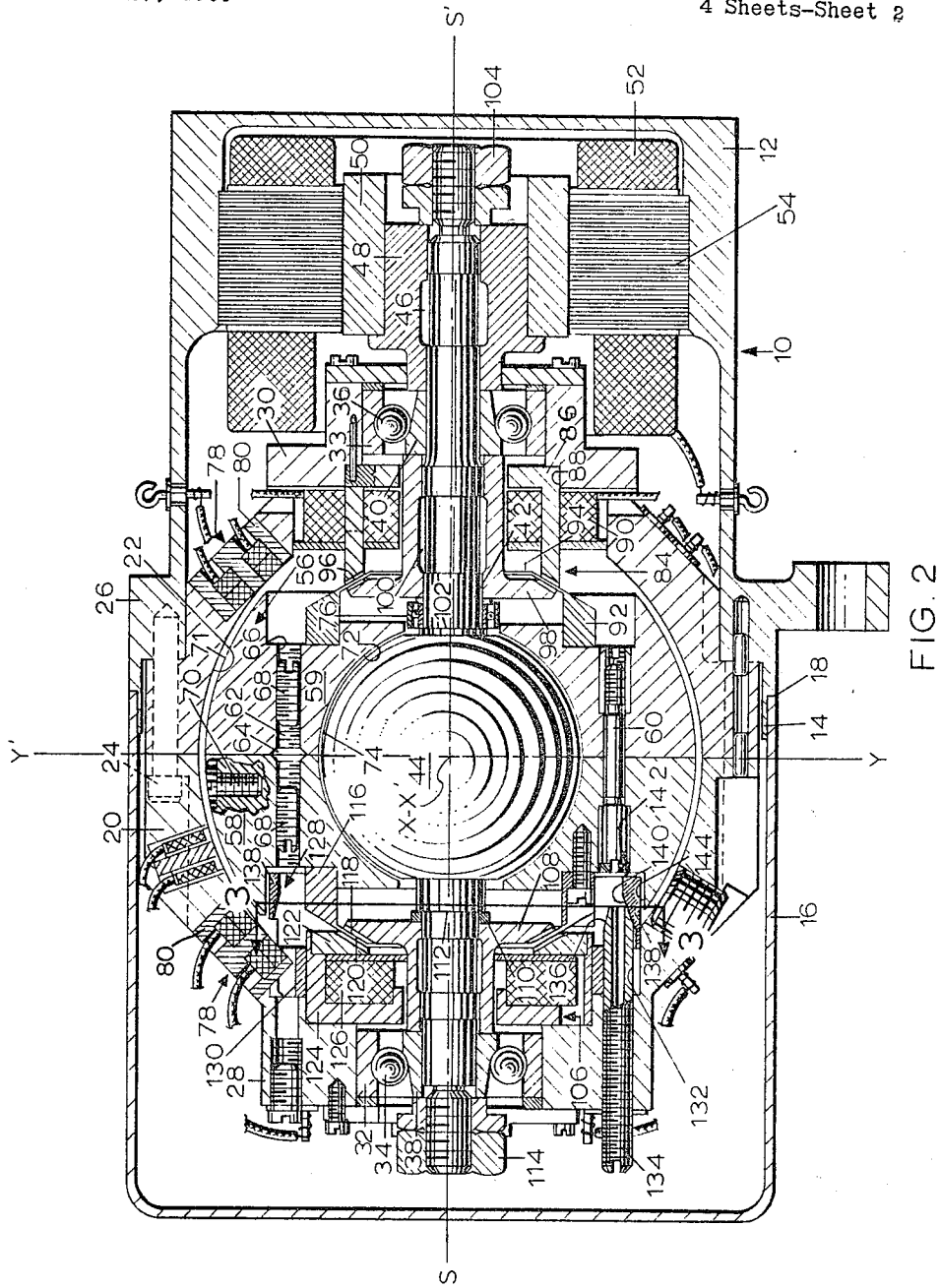
FIG. 2 is a cross-section taken on line 2—2 of FIG. 1.
Figure 3:
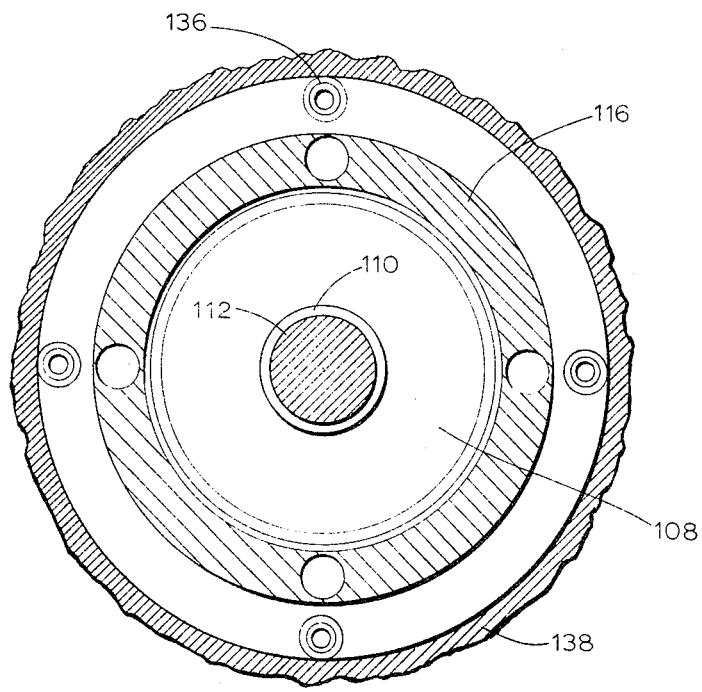
FIG. 3 is a cross-section taken along line 3—3 of FIG. 2.

Referring now to the drawings, and particularly to FIGS. 1–3, the preferred form of the present invention is shown to include a hermetically sealed housing generally designated by the reference numeral 10. The housing is of a two-part construction, having a mounting part 12 formed with a projecting cylindrical portion 14 for telescopically receiving a cover part 16. The housing parts are hermetically sealed such as by a weld joint at 18 to assure effective containment of an inert gas such as helium and to enable the operation of a hydrodynamic gas bearing. A gyro casing 20 having an inner concave spherical surface 22 is secured to the mounting part 12 of the housing by a plurality of axially extending bolts 24 threadably received within a peripheral boss 26 on the mounting part. The gyro casing is formed at opposed ends with axially bored bosses 28 and 30 to support, among other components, outer races 32 and 33 of ball bearings 34 and 36 respectively. Respective inner races 38 and 40 of the ball bearings 34 and 36 engage a rotatable shaft 42 at points equally spaced on opposite sides of a spherical bearing member 44 formed integrally in the form shown on the shaft 42. Keyed to the right hand end of the shaft 42 as seen in FIG. 2 of the drawings by way of splines 46, is a generally cylindrical mount 48 for supporting an armature 50. The armature 50 forms part of the gyro drive motor, the stator of which is formed of field windings 52 on a laminated core 54 press fit or otherwise suitably secured within the mounting part 12 of the housing 10. Thus, it will be appreciated that upon energization of the windings 52, the armature 50, shaft 42 and spherical bearing member 44 thereon will be rotated about the axis established by the ball bearings 34 and 36.

The gyro rotor is generally designated by the reference numeral 56 and, as shown in FIG. 2, substantially fills the annulus between the spherical bearing member 44 and the inner surface 22 of the gyro casing 20. The rotor is formed in two axial parts 58 and 59 secured together by a plurality of axially extending bolt assemblies 60. To effect axial balance of the rotor, a plurality of radially spaced threaded bolt members 62 having a central enlargement 64 engaged on opposite sides by the rotor halves 58 and 59 are positioned in bores 66. A threaded nut member 68 is received on each end of the bolt members 62 to facilitate accurate disposition of and balancing of rotor weight along its spin axis S–S'. Radial balance of the rotor is achieved by filing off discrete amounts of four radial balance screws 70 located on the outside periphery of the rotor. The rotor is formed with an outer spherical surface 71 spaced from the casing surface 22 and with an inner spherical concave surface 72 generally complementing the spherical bearing member 44 but spaced slightly therefrom to provide a gas bearing clearance gap 74. Because of the spherical configuration of the bearing thus afforded, the rotor is sensitive to angular displacement about two mutually orthogonal axes X–X' and Y–Y' but is limited in angular extent of movement about these axes by a ball bearing stop 76 positioned on the shaft 42.

The manner in which the rotor 56 is suspended and driven in operation may now be understood. As above mentioned, when the field windings 52 are energized to apply torque to the armature 50, the shaft 42 and spherical bearing member 44 thereon are rotated about the axis defined by the ball bearings 34 and 36. During the initial stages of rotation, the rotor 56 is carried by the spherical bearing member 44 until the viscous drag on the outer periphery of the rotor spaced slightly from the inner spherical surface of the gyro casing 20 approaches torque transmitted across the gas bearing gap 74. When sufficient, relative rotation between the rotor and the spherical bearing member 44 occurs, the gas in the gap 74 lifts the rotor from the spherical bearing member 44 and becomes suspended entirely on gas. As the rotational velocity of the spherical bearing member 44 achieves operating speed, the spin velocity of the rotor stabilizes at constant speed when the driving torque transmitted through the gas bearing gap 74, by virtue of the viscous drag effected by the gas, becomes equal to or is balanced by the drag torques exerted on the outer periphery of the rotor. Also, it will be noted that because of the spherical configuration of the gas bearing gap 74, the rotor is permitted to sense torque about both axes X–X' and Y–Y'.

To sense angular displacement of the rotor 56 about the two mutually orthogonal axes X–X' and Y–Y', in the embodiment shown in FIGS. 1–3, four electromagnetic pickoffs or sensors 78 are provided on each axis or a total of eight for the gyroscope. Each of the sensors includes a ferrite cup core 80 containing axially arranged excitation and secondary windings. As shown in FIG. 2, the radial axes of the sensors are positioned adjacent the ends of the rotor and operate to sense angular displacement of the rotor about the axes X–X' and Y–Y' in a manner well known to those skilled in the art.

To orient the spin axis of the rotor 56, a torquer is provided and generally designated by the reference numeral 84 (FIG. 2). The torquer includes orthogonally arranged, stationary pole pieces 86 positioned within a counterbore 88 in the end boss 30 of the gyro casing 20, each pole piece having a coil 90 positioned thereon. A manganin eddy current ring 92 is bolted or otherwise suitably secured to the rotor 56 and formed having an angularly projecting annular lip 94 extending into a gap 96 formed between the ends of the pole piece 86 and a rotatable core member 98 of generally T-shaped cross-section to establish a return flux path. The rotatable core member is keyed to the shaft 42 such as by splines 100 and is secured against axial displacement along with the ball bearing stop 76, the ball bearing inner race 40 and armature mount 48 by abutment between a shoulder 102 on the shaft 42 and a lock nut assembly 104. Also, it will be noted that the lip 94 and the gap 96 are aligned with a generally conical surface. Hence, the torquer operates to apply an orienting torque about the orthogonal axes X–X' and Y–Y' by the action of eddy currents produced within the lip 94. These eddy currents cause a force to be developed on ring 92 resulting in a torque on the rotor dependent on which of the coils 90 is energized and the energizing current supplied thereto.

Although the error producing restraints on the gyroscope rotor 56 are small because of the substantially complete absence of mechanical, electrical or magnetic restraints in the gas bearing gyroscope of this invention, small restraints do exist between the rotor and the case or case-associated parts of the gyroscope due to the viscous or turbulent effects of the gaseous supporting and driving medium. For example, if the rotor spin axis S–S' is completely aligned with the axis of the shaft 42, the net restraining torque on the sensitive axes X–X' and Y–Y' is zero. However, when a misalignment angle occurs between the axis of the shaft 42 and the spin axis S–S' of the rotor, a torque proportional to the misalignment angle appears on the quadrature axis (either of the sensitive gyro axes X–X' or Y–Y' not sensing the input angle or angle to be measured by the gyroscope). To correct for this restraint, a quadrature restraint compensation device generally designated by the reference numeral 106 is provided. The quadrature restraint compensation device includes a rotating pole piece 108 having twelve radially arranged magnetic poles as shown in FIGS. 2 and 3 of the drawing. This pole piece is keyed to the shaft 42 and secured axially thereon by an abutment ring 110 engaged between the pole piece 108 and a shoulder 112 on the shaft 42 by a lock nut assembly 114 acting through the inner ball bearing race 38 and the pole piece. A copper eddy current ring 116, similar in structure to the eddy current ring 92 above mentioned, is bolted or otherwise suitably secured to the end of the rotor 56 opposite from the torquer and formed having an annular lip 118 extending part way into an air gap 120 between the pole piece 108 and an annular pole member 122 forming with an annular cup member 124 a casing for a coil 126. The cup member 124, and thus the coil 126 and pole member 122 are supported on the casing 20 and thus remain stationary in operation. The pole piece 108 not only rotates relative to the pole member 122 and coil 126 to develop a rotating flux in the gap 120, but also rotates relative to the eddy current ring 116 because the shaft 42 rotates at speeds in excess of the rotor 56. Accordingly, the rotating pole piece 108 generates eddy currents in the ring 116. The interaction of the eddy current flux and the rotating flux acts to orient the lip 118 in the air gap 120 and torque the rotor 56 about the sensing axes X–X' and Y–Y' to align the spin axis S–S' with the axis of the shaft 42. The magnitude of the compensation torque can be varied by regulating the current to the quadrature compensation coil 126 until the net torque on the quadrature axis is zero. Moreover, since the gap 120 and the lip 118 on the ring 116 are aligned tangentially with respect to a sphere having its center at the intersection of the sensitive axes X–X' and Y–Y', substantially the same torquing force is generated throughout the limited angular movement experienced about these axes for the same applied coil current.

In addition to the quadrature restraint, the uncompensated gyroscope experiences a restraint about the sensitive axes proportional to the misalignment angle between the spin axis S–S' and the axis of the case. To compensate for this restraint, an in phase restraint compensation device is provided in the form of an annular slider bearing 128. As shown in FIGS. 2 and 3, the slider bearing is formed having a mounting portion 130 press fit or otherwise suitably secured in the gyro casing 20 and having four symmetrically disposed axial bores 132, each receiving a screw 134 having a conical taper 136 at the end thereof. Projecting axially from the mounting portion 130 are a plurality of arcuate segments 138 having a tapered undercut 140 to complement the taper 136 on the screws 134. The arcuate segments 138 project into an annular groove 142 in the end face of the rotor and are spaced relative to the peripheral wall 144 of the groove by axial adjustment of the screws 134. Hence, by adjusting the gap between the slider bearing segments 138 and the inner peripheral wall 144 on the rotor 56 until the pressure induced torques on the rotor exactly balance the restraint torque proportional to the misalignment angle between the rotor and the case, the effects of the restraint torque can be nullified.

Figure 4:
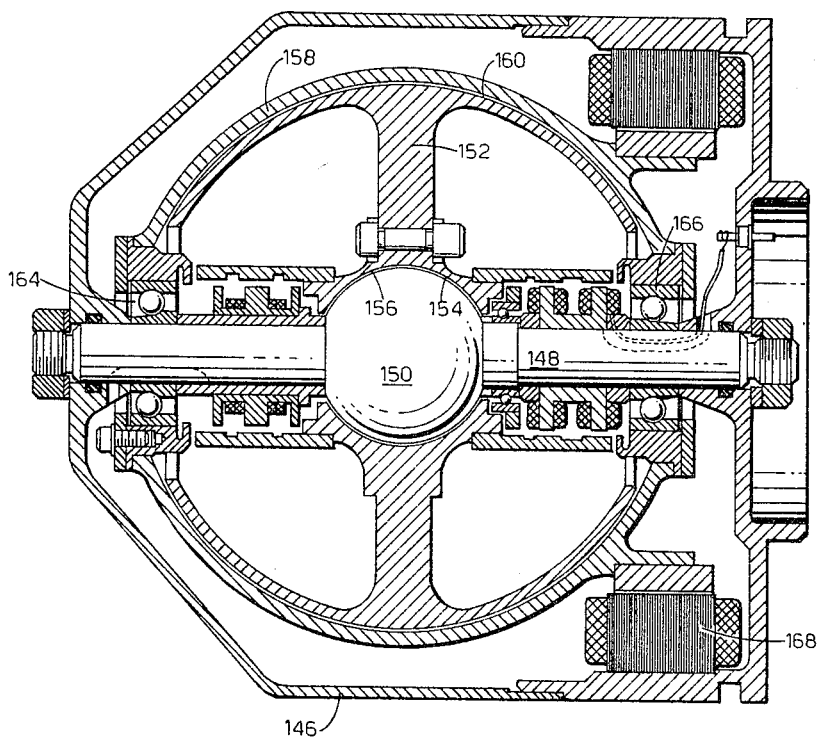
FIG. 4 is a schematic view in cross-section along the spin axis of an alternative embodiment of the present invention.

Referring now to FIG. 4, an alternative form of the gas bearing and drive feature of the present invention is schematically illustrated. As shown, the modified gyroscope includes a housing 146 hermetically sealed as in the aforementioned embodiment to facilitate hydrodynamic gas bearing operation. In this instance, however, a shaft 148 having a spherical bearing member 150 thereon is fixed to the housing 146. A rotor 152 of generally spherical external shape is provided with an inner spherical surface 154 spaced slightly from the surface of the spherical bearing member 150 to provide a gas bearing gap 156. The external spherical surface of the rotor 152 is spaced slightly from a rotatable gyro casing 158 to effect a viscous drive gap 160. The casing 158 is journaled in ball bearings 162 and 164 at opposite ends of the shaft 148 and is arranged to be driven by a motor generally designated by the reference numeral 168. Hence, the gyroscope rotor 152 is supported on the spherical ball member 150 by way of a gas bearing gap 154 in accordance with conventional gas bearing rotor techniques. In this embodiment, however, the rotor 152 is completely freed of any restraints due to electric, magnetic or mechanical drive coupling because of the transmission of spin torque thereto through the viscous gas drive resulting from the gap 160 and rotation of the outer casing 158. The operation of the gyroscope of FIG. 4 is substantially the same as the embodiment of FIGS. 1–3 in substantially all other respects.

Thus, it will be appreciated that by this invention there is provided an extremely effective gyroscope by which the above-mentioned objects are completely fulfilled. Since the present invention may take a variety of specific forms and be adapted to different gyroscope applications, it is to be distinctly understood that the foregoing description is illustrative only, not limiting, and that the true spirit and scope of the present invention are to be determined by reference to the accompanying claims.

The invention claimed is:

1. A gyroscope for sensing angular displacement about two mutually orthogonal axes, said gyroscope comprising: a rotor having inner and outer spherical surfaces mutually concentric with the rotor spin axis, a casing positioned about said rotor, a spherical bearing member rotatably supported on said casing for rotation about an axis perpendicular to the orthogonal sensing axes, said bearing member being concentric with and spaced slightly from the inner spherical surface of said rotor to define a gas bearing gap, means for containing gas in said gap, drive means coupled to said bearing member for rotating said bearing member and said rotor under the influence of the viscous gas drag between said bearing member and said rotor, a torquer to orient the spin axis of said rotor, pick-off means on the mutually orthogonal sensing axes for sensing angular displacement of said casing about the orthogonal sensing axes, and restraint compensating means to balance restraints to angular displacement due to gas turbulence and viscosity.

2. The apparatus recited in claim 1 wherein said restraint compensating means includes quadrature restraint compensation means for balancing torques on the orthogonal sensing axes when the rotational axis of said bearing member becomes misaligned with the rotor spin axis and an in phase restraint compensation means for balancing torque restraint upon misalignment between the rotor and the casing.

3. The apparatus recited in claim 2 in which said quadrature restraint compensation means includes a magnetic flux generating coil mounted on said casing concentric about the rotational axis of said spherical bearing member, means establishing a flux path about said coil, said last-mentioned means including stationary pole means fixed to said coil and rotatable pole means mounted for rotation with said spherical bearing member, said pole means being spaced from each other to establish an annular air gap, and annular conductor means on said rotor concentric with the spin axis thereof and projecting into said air gap whereby the interaction of eddy current flux and rotating flux in said air gap exerts a torque on said annular conductor means and said rotor proportional to the current fed to said coil.

4. The apparatus recited in claim 2 in which said in phase restraint compensation means comprises an annular slider bearing mounted on said casing and spaced with respect to a surface on said rotor to effect a clearance gap, said slider bearing being adjustable to vary said clearance gap about the spin axis of said rotor whereby the pressure induced torque on the rotor in said clearance gap may be adjusted to balance the in phase restraint thereof.

5. The apparatus recited in claim 2 wherein said restraint compensating means are positioned on one end of said rotor and said torquer is positioned on the opposite end of said rotor therefrom, said torquer including a plurality or orthogonally arranged magnetic flux generating coils, an axially projecting pole piece in each of said coils, said coils and said pole pieces being mounted on said casing, a rotatable pole piece mounted for rotation with said spherical bearing member and spaced from said coil pole pieces to establish an annular air gap, and annular conductor means mounted on said rotor to project within said air gap to enable the application of torque to said rotor about said mutually orthogonal sensing axes.

6. In a gyroscope for sensing angular displacement about two mutually orthogonal sensing axes and having a casing, a rotatably driven bearing member mounted in said casing with one axis of rotation fixed relative to said casing, and a rotor having a surface complementary to said bearing member and coacting therewith to define a gas bearing clearance gap supporting the rotor to spin in the casing; quadrature restraint compensation means comprising: a magnetic flux generating coil mounted on the casing and concentric about the rotational axis of the bearing member, means establishing a flux path around said coil, said means including stationary pole means fixed to said coil and rotatable pole means mounted for rotation with the bearing member, said pole means being spaced from each other to establish an annular air gap, and annular conductor means on the rotor concentric with the spin axis thereof and projecting into said air gap whereby the interaction of eddy current flux and rotating flux in said air gap exerts a torque on said annular conductor means and said rotor proportional to the current fed to said coil.

7. The apparatus recited in claim 6 in which said air gap and said conductor means are tangentially aligned with respect to a sphere having its center at the intersection of the mutually orthogonal sensing axes.

8. The apparatus recited in claim 6 wherein said stationary pole means is a continuous annular ring and wherein said rotatable pole means includes a plurality of radially arranged pole pieces.

9. In a gas bearing gyroscope for sensing annular displacement about two mutually orthogonal axes and having an outer casing member, an inner bearing member, a rotor with concentric inner and outer spherical surfaces disposed between said inner bearing member and outer casing member, and means mounting said members with the inner bearing member within the outer casing member so that one of the members is stationary while the other is rotatable about a fixed axis and with respect to the rotor to suspend and spin the rotor; quadrature restraint compensation means comprising: a magnetic flux generating coil mounted on the stationary member concentric about the fixed rotational axis, means establishing a flux path about said coil, said means including stationary pole means fixed to said coil and rotatable pole means mounted for rotation with the rotational one of said members, said pole means being spaced relative to each other to establish an annular air gap, and annular conductor means on the rotor concentric with the spin axis thereof and projecting into said air gap whereby the interaction eddy current flux and rotating flux in said air gap exerts a torque on said annular conductor means and said rotor proportional to the current fed to said coil.

10. The apparatus recited in claim 9 including further, in phase restraint compensation means comprising an annular slider bearing mounted on the stationary one of said members and spaced with respect to a surface on the rotor to effect a clearance gap, and means to adjust said slider bearing to vary said clearance gap whereby the pressure induced torques on the rotor in said clearance gap balance the in phase restraint.

11. The apparatus recited in claim 9 including means defining an annular groove in the end of said rotor having a peripheral wall, said slider bearing having a plurality of axially projecting arcuate segments spaced from the peripheral wall of said annular groove, said casing including a plurality of axial bolts therein having tapered ends for radially positioning said segments.

12. A gyroscope for sensing angular displacement about two mutually orthogonal sensing axes, said gyroscope comprising in combination: a hermetically sealed housing; a gyro casing mounted within said housing and having an inwardly facing, generally concave spherical surface; a rotatable shaft journaled in said casing for rotation about an axis perpendicular to the mutually orthogonal sensing axes, one end of said shaft extending from said casing; an electric motor in said housing to drivably rotate said shaft by torque applied at the end thereof projecting from said casing; a spherical bearing member on said shaft and centrally disposed within said casing; a rotor having an inner spherical surface spaced from said spherical bearing member to provide a gas bearing clearance gap and an outer spherical surface spaced from said casing surface; electromagnetic pick-off means supported on said casing at the mutually orthogonal sensing axes; a torquer disposed on one axial end of said rotor, said torquer including orthogonally arranged magnetic flux generating coils each having axially extending pole pieces, said coils and said axially extending pole pieces being mounted on said casing, a rotatable pole piece fixed to said shaft and spaced from said stationary pole pieces to establish an annular air gap, and an annular conductor fixed to said rotor and extending into said air gap; quadrature restraint compensation means disposed on the opposite end of said rotor from said torquer and including a casing mounted coil and an annular pole piece about said coil, a plurality of rotatable pole pieces spaced from said annular pole piece to establish another air gap, and a second conductor ring projecting within said other air gap; and in phase restraint compensation means on said casing adjacent said quadrature restraint compensation means, said in phase restraint compensation means including a slider bearing adjustably spaced from a surface on said rotor to balance the pressure induced torques between said slider bearing and said rotor with the in phase restraint between said rotor and said casing.

References Cited by the Examiner
UNITED STATES PATENTS

| | | | |
|---|---|---|---|
| 2,850,905 | 9/1958 | Sedgfield | 74—5.7 |
| 2,852,943 | 9/1958 | Sedgfield | 74—5.7 |
| 2,940,318 | 6/1960 | Adams et al. | 74—5 |
| 3,025,708 | 3/1962 | Slater et al. | 74—5.46 |
| 3,073,170 | 1/1963 | Slater et al. | 74—5.4 |

FRED C. MATTERN, JR., *Primary Examiner.*

SAMUEL FEINBERG, *Examiner.*

R. F. STAHL, *Assistant Examiner.*